United States Patent Office 3,314,978
Patented Apr. 18, 1967

3,314,978
3-(p-AMINOPHENOXY) ESTRA-1,3,5(10)-TRIENES
David Darwin Evans, Staines, England, assignor to Parke, Davis & Company, Detroit, Mich., a corporation of Michigan
No Drawing. Filed Sept. 27, 1965, Ser. No. 490,644
Claims priority, application Great Britain, Oct. 21, 1964, 43,018/64
5 Claims. (Cl. 260—397.5)

The present invention relates to new steroid compounds and to methods for their production. More particularly, the invention relates to new 3-(p-aminophenoxy) estra-1,3,5(10)-triene compounds, having the formula

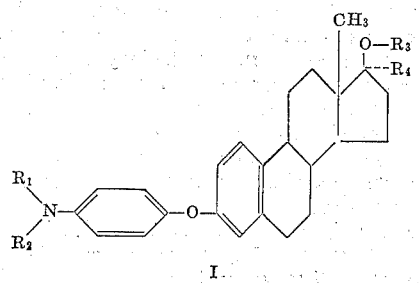

I and to pharmaceutically-acceptable salts thereof; where $R_1$ and $R_2$ are each hydrogen, methyl, or ethyl; $R_3$ is hydrogen or a lower alkanoyl radical having not more than 4 carbon atoms; and $R_4$ is hydrogen, methyl, ethyl, or ethynyl.

In accordance with the invention, 3-(p-aminophenoxy) estra-1,3,5(10)-triene compounds having the formula

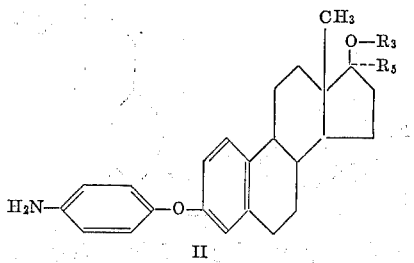

II are produced by the reduction of a 3-(p-nitrophenoxy) estra-1,3,5(10)-triene compound having the formula

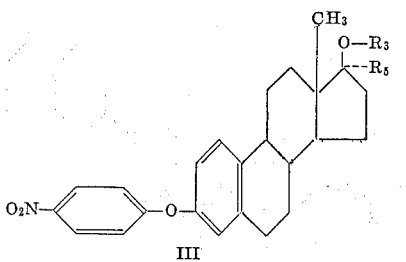

III where $R_3$ is as defined above and $R_5$ is hydrogen, methyl, or ethyl. The reduction may be accomplished by employing chemical or catalytic means. Chemical reducing agents that may be used include metals, such as zinc, iron, and tin, in the presence of an inorganic or organic acid, such as hydrochloric acid, sulfuric acid, and acetic acid; a stannous halide in a hydrohalic acid; and sodium hydrosulfite in an aqueous solvent medium. The reduction is accomplished catalytically by employing gaseous hydrogen and Raney nickel or a noble metal catalyst, such as platinum, platinum oxide, palladium, or palladium oxide, which may optionally be supported on an inert carrier, such as charcoal. Catalytic reduction employing a noble metal catalyst and hydrogen at room temperature and one atmosphere pressure in an inert solvent is the preferred method. Higher temperatures and pressures may also be employed. Suitable solvents that may be used for reduction by catalytic means include lower alkanols, preferably ethanol; lower alkanoic acid esters, preferably ethyl acetate; ethers, such as tetrahydrofuran, dioxane, and glycol ethers; N,N-dimethylformamide; and mixtures of these. When chemical reduction means are employed, solvents that may be used include lower alkanols, tetrahydrofuran, N,N-dimethylformamide and other similar solvents that are miscible with water. In the latter case, it is preferable to use a slight excess of reducing agent, although approximately equivalent amounts of reactants may also be used. When the reduction is accomplished catalytically, the reaction is allowed to proceed until the required amount (3 molecular equivalents) of hydrogen has been taken up.

The 3-(p-nitrophenoxy)estra-1,3,5(10)-triene compounds of Formula III used as starting materials in the foregoing process can be prepared in a number of ways. 3-(p-nitrophenoxy)estra-1,3,5(10)-trien-17β-ol, the compound of Formula III where both $R_3$ and $R_5$ are hydrogen, is prepared by reducing 3-(p-nitrophenoxy)estra-1,3,5(10)-trien-17-one with, for example, potassium borohydride. The 3-(p-nitrophenoxy)estra-1,3,5(10)-triene compounds of Formula III where $R_3$ is hydrogen and $R_5$ is methyl or ethyl can be prepared by reacting 3-(p-nitrophenoxy)estra-1,3,5(10)-trien-17-one with methyl lithium or ethyl lithium in an anhydrous, unreactive solvent and hydrolysing the reaction product with an aqueous medium. The 3-(p-nitrophenoxy)estra-1,3,5(10)-trien-17β-ester starting materials, that is, the compounds of Formula III where $R_3$ is lower alkanoyl, can be prepared by reacting the corresponding 3-(p-nitrophenoxy)estra-1,3,5(10)trien-17β-ol compounds with a reactive derivative of an acid having the formula

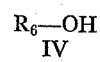

IV where $R_6$ is a lower alkanoyl radical having not more than 4 carbon atoms.

The preparation of the 3-(p-nitrophenoxy)estra-1,3,5(10)-trien-17-one used in these procedures has been reported by L. F. King and W. R. Franks in the Journal of the American Chemical Society, volume 63, pages 2042–2045 (1941).

Also in accordance with the invention, 3-(p-aminophenoxy)estra-1,3,5(10)-trien-17β-ol compounds having the formula

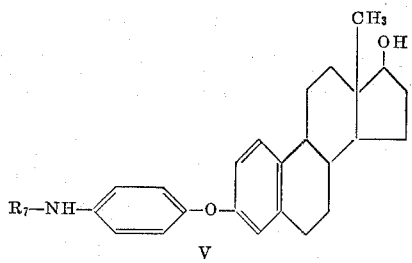

V are produced by the reduction of a 3-(p-acylaminophenoxy)estra-1,3,5(10)-triene compound having the formula

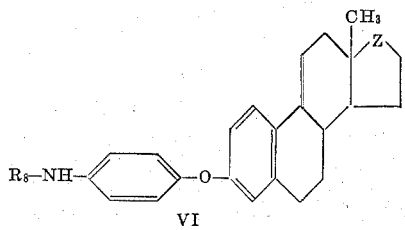

VI

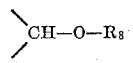

where $R_7$ is methyl or ethyl; $R_8$ is formyl or acetyl; and Z is a carbonyl (>C=O) group or an alkanoyloxymethylene group of the formula $$\diagdown CH-O-R_8 \diagup$$

where $R_8$ is the same as above. The reduction is preferably carried out by means of lithium aluminum hydride in an inert solvent medium. Suitable solvents for use in the reaction are dioxane; tetrahydrofuran; dialkyl ethers, such as diethyl ether; glycol ethers, such as 1,2-dimethoxyethane; and mixtures of these. The reduction is most conveniently carried out at the reflux temperature of the solvent employed; the temperature, however, is not critical and may be chosen from a wide range, from 0 to 100° C. The duration of the reaction is likewise not critical and may be varied from several minutes to several hours, depending upon the temperature employed. The reducing agent is normally used in excess of the amount required to effect complete reduction of both reducible groups of the 3-(p-acylaminophenoxy)estra-1,3,5(10)-triene compounds of Formula VI. Following complete reduction, the reaction product mixture is hydrolyzed with an aqueous medium, such as water, dilute aqueous inorganic acids or bases, or other media containing water.

The 3-(p-acylaminophenoxy)estra - 1,3,5(10) - triene compounds of Formula VI used as starting materials in the foregoing process can be prepared in different ways. The 3-(p-acylaminophenoxy)estra-1,3,5(10)-trien-17-one compounds, that is, the compounds of Formula VI where $R_8$ is formyl or acetyl and Z is a carbonyl group, are prepared by reacting 3-(p-aminophenoxy)estra-1,3,5(10)-trien-17-one with formic or acetic acid, or with a reactive derivative thereof. The 3-(p-acylaminophenoxy)estra-1,3,5(10)-triene compounds of Formula VI where $R_8$ is formyl or acetyl and Z is an alkanoyloxymethylene group as defined above are prepared by reacting 3-(p-aminophenoxy)estra-1,3,5(10)-trien-17β-ol with at least two molar equivalents of formic or acetic acid, or a reactive derivative of these acids.

Further in accordance with the invention, 3-(p-aminoestra-1,3,5(10) - trien - 17 - one compound having the the formula

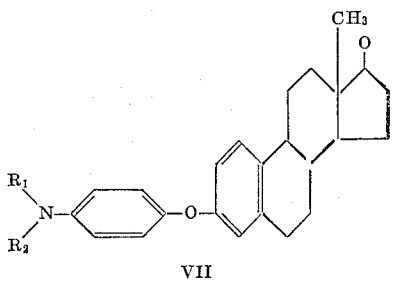

VII are produced by the reduction of a 3-(p-aminophenoxy) estra-1,3,5(10) - trien - 17 - one compounds having the formula

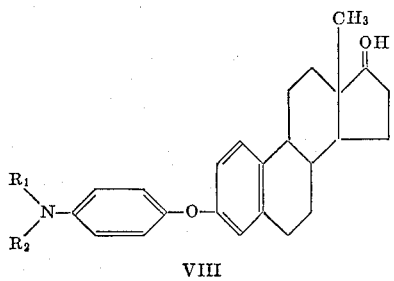

VIII where $R_1$ and $R_2$ have the aforementioned significance. The reduction may be accomplished by employing chemical or catalytic means. Chemical reducing agents that may be used include lithium aluminum hydride and alkali metal borohydrides, such as potassium borohydride. The reduction is accomplished catalytically by employing gaseous hydrogen and Raney nickel or a noble metal catalyst, such as platinum, platinum oxide, palladium, or palladium oxide, which may optionally be supported on an inert carrier, such as charcoal. A preferred reducing agent is an alkali metal borohydride. Suitable solvents for use with an alkali metal borohydride include lower alkanols, such as methanol and ethanol; aromatic hydrocarbons, such as benzene; ethers, such as dioxane and tetrahydrofuran; N,N-dimethylformamide; and mixtures of these. An ethereal solvent is preferred for use with lithium aluminum hydride. When catalytic reduction means are employed, suitable solvents are lower alkanols, lower alkanoic acid esters, ethers, N,N-dimethylformamide, and mixtures of these. The temperature and duration of the reduction are not critical and may be varied over a wide range. When catalytic means are employed, room temperature and one atmosphere pressure are the preferred conditions. Under these conditions, the reduction is allowed to proceed until the required amount (one molecular equivalent) of hydrogen has been taken up. When chemical means are used, the preferred conditions are a temperature in the range of 10°–50° C. and a duration of about one hour. When either or both of $R_1$ and $R_2$ in Formula VIII above are hydrogen, best results are obtained when an excess of chemical reducing agent is employed.

The 3-(p-aminophenoxy)estra-1,3,5-trien-17-one compounds of Formula VIII, where $R_1$ and $R_2$ are each methyl or ethyl, that are used as starting materials in the foregoing process are prepared by appropriate alkylation of 3-(p-aminophenoxy)estra-1,3,5(10)-trien-17-one.

Still further in accordance with the invention, 3-(p-aminophenoxy)estra-1,3,5(10)-trien-17β - ol compounds having the formula

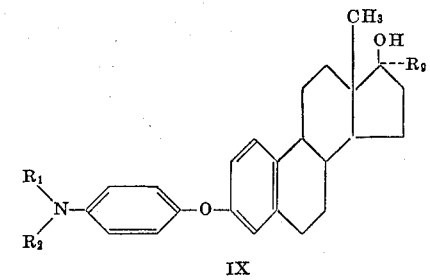

IX are produced by reacting a 3-(p-aminophenoxy)estra-1,3,5(10)-trien-17-one compound having the formula

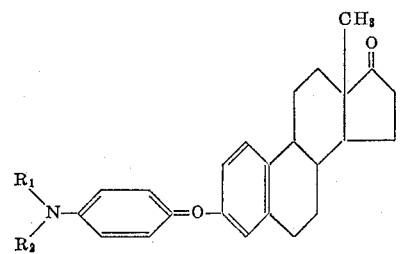

X with a reactive organometallic compound having the formula $$R_9-M$$

in an inert, anhydrous solvent, followed by hydrolysis of the reaction product with an aqueous medium; where $R_1$ and $R_2$ are as defined previously; $R_9$ is methyl, ethyl, or ethynyl; and M is a metallic residue, such as an alkali metal, an alkaline earth metal, or a magnesium halide. Suitable solvents for use in the reaction include ethers, such as diethyl ether, di-n-butyl ether, tetrahydrofuran, and dioxane; aromatic hydrocarbons, such as benzene and toluene; and mixtures of these. Equivalent amounts of reactants may be used, but preferably the organometallic compound of Formula XI is employed in excess. The temperature and duration of the reaction are not critical, and may be varied over a wide range. When an alkali metal organometallic compound is employed, a temperature in the range of 20–35° C. is preferred. When the organometallic compound used is a magnesium halide derivative, the reaction is preferably carried out at the reflux temperature of the reaction medium. In all cases the reaction is essentially complete after a period of two to 24 hours. Following initial reaction of the steroid compound with the organometallic compound, the reaction product is hydrolyzed with an aqueous medium, such as water, dilute aqueous inorganic acids or bases or other media containing water.

In accordance with yet another process of the invention, 3-(p-aminophenoxy)estra - 1,3,5,(10) - triene compounds having the formula

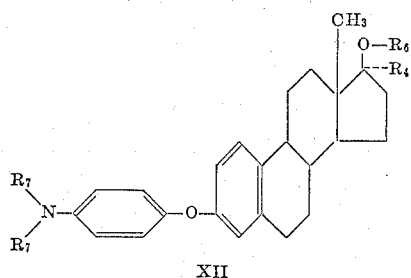

XII are produced by the reaction of a 3-(p-aminophenoxy)-estra-1,3,5(10)-trien-17β-ol compound having the formula

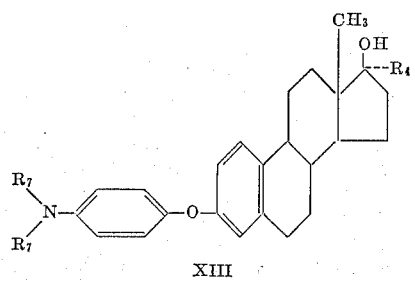

XIII with a reactive derivative of an acid having Formula IV above; where $R_4$, $R_6$, and $R_7$ have the aforementioned significance. Reactive derivatives of the acid of Formula IV that may be used include the acid halide and the acid anhydride. When the acid anhydride is used, it is preferable to add to the reaction mixture an acidic catalyst, such as p-toluenesulfonic acid. When an acid halide, preferably an acid chloride, is used, a tertiary amine catalyst, such as pyridine or triethylamine, is used in an amount sufficient to bind the hydrohalic acid liberated. Solvents, are employed as follows: tetiary amines, such as pyridine and triethylamine, either alone or toegther with an ether, such as diethyl ether or tetrahydrofuran, or an aromatic hydrocarbon, such as benzene, may be used in the reaction with an acid halide or acid anhydride; added solvent may, however, be omitted in the reaction with an acid anhydride, in which case a several-fold excess of anhydride is used. The temperature may be varied over the range, 0–175° C., depending on the reactant and solvent employed. The preferred range for an acid halide reactant is 20–50° C., while for an acid anhydride the preferred range is 20–40° C. when an acid catalyst is added, and 40–175° C. in the absence of such a catalyst. The duration of the reaction will also vary over a wide range, depending on the reactant used. With an acid halide, the range is 2 to 24 hours, with a range of 3 to 8 hours preferred. With an acid anhydride, the reaction is normally complete in 1 to 3 hours, although a period as long as 18 hours may be required.

An alternative method for carrying out the foregoing process comprises the initial reaction of a 3-(p-aminophenoxy)estra-1,3,5(10)-trien-17β - ol compound having Formula XIII with a lower alkyl magnesium halide, such as methylmagnesium iodide or ethylmagnesium bromide, and the subsequent reaction of the intermediate of the formula

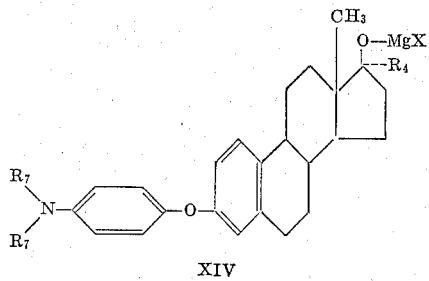

XIV with an acid halide derivative of an acid of Formula IV, in an unreactive solvent, such as diethyl ether, tetrahydrofuran, or 1,2-dimethoxyethane, at a temperature in the range, 0–50° C., for a period of from 5 to 72 hours. In Formula XIV, $R_4$ and $R_7$ have the aforementioned significance and X represents a halogen atom.

Also in accordance with the invention, 3-(p-aminophenoxy)-17α-ethylestra-1,3,5(10)-triene compounds having the formula

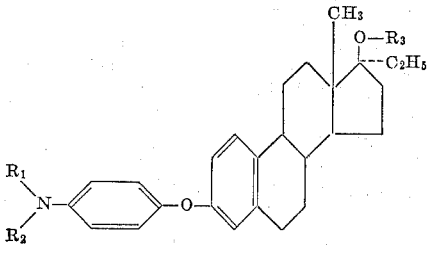

XV are produced by the reduction of a 3-(p-aminophenoxy)-17α-ethynylestra-1,3,5(10)-triene compound having the formula

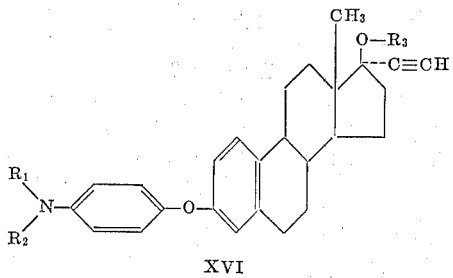

XVI where $R_1$, $R_2$, and $R_3$ are as defined previously. The reduction is most advantageously accomplished catalytically, employing gaseous hydrogen and Raney nickel or a noble metal catalyst, such as platinum, platinum oxide, palladium, or palladium oxide, which may optionally be supported on an inert carrier, such as charcoal. The reduction is preferably carried out at room temperature under one atmosphere of hydrogen pressure in an inert solvent. A wide range of temperatures, from 10° to 100° C., and of pressures, from 1 to 4 atmospheres, may also be employed. Suitable inert solvents include lower alkanols, preferably ethanol; lower alkanoic acids, such as acetic acid; lower alkanoic acid esters, preferably ethyl acetate; ethers, such as tetrahydrofuran, dioxane, and glycol ethers; N,N-dimethylformamide; and mixtures of these. The reduction is normally completed during a period of from 15 minutes to 4 hours, and, in the usual case, is allowed to proceed until the required amount (2 molecular equivalents) of hydrogen has been taken up.

The compounds of the invention can exist in the free base form having Formula I or in the form of one of their acid-addition salts with a variety of inorganic or organic acids. Some representative pharmaceutically-acceptable acid-addition salts are the hydrochloride, hydrobromide, sulfate, phosphate, citrate, acetate, benzoate, and maleate. When it is desired to employ the compounds of the invention in the form of one of their acid-addition salts, the salt formation is suitably carried out by reacting the selected base with the selected acid in an unreactive solvent. The acid-addition salts can be converted to the free bases by reaction with a base such as sodium hydroxide or potassium hydroxide.

The compounds of the invention are useful pharmacological agents. They are anti-fertility agents that also exhibit hypocholesteremic activity. They are active upon oral administration.

A preferred compound of the invention because of its high degree of hypocholesteremic activity as well as its high degree of activity as an anti-fertility agent is 3-(p - dimethylaminophenoxy) - 17α - methylestra - 1,3,5(10)-trien-17β-ol.

The invention is illustrated by the following examples:

Example 1

A mixture of 1.57 g. of 3-(p-nitrophenoxy)-estra-1,3,5(10)-trien-17β-ol, 157 mg. of platinum oxide, and 200 ml. of ethyl acetate is shaken at room temperature with hydrogen at one atmosphere pressure until 3 molar equivalents of hydrogen are taken up. The catalyst is removed by filtration, and the filtrate is concentrated to near-dryness. The solid 3-(p-aminophenoxy)estra-1,3,5(10)-trien-17β-ol obtained upon cooling is isolated and crystallized from ethyl acetate; M.P. 228–231° C.

The 3 - (p-nitrophenoxy)estra-1,3,5(10)-trien-17β-ol used as starting material in the foregoing procedure is prepared as follows. To a stirred suspension of 3.91 g. of 3-(p-nitrophenoxy)estra-1,3,5(10)-trien-17-one in 800 ml. of methanol and 200 ml. of 96% ethanol is added, in portions, 1.62 g. of potassium borohydride, and the resulting mixture is stirred at room temperature for 1.5 hours. After the addition of 3 ml. of acetic acid, the mixture is concentrated to approximately 300 ml. under reduced pressure at a temperature below 50° C., and diluted with 100 ml. of water. The solid 3-(p-nitrophenoxy)estra-1,3,5,(10)-trien-17β-ol obtained is isolated and crystallized from ethylacetate; M.P. 195–196°C.

Example 2

A solution of 1 g. of 3-(p-aminophenoxy)estra-1,3,5(10)-trien-17-one in 20 ml. of 75% formic acid is heated under reflux for 1 hour, cooled, and treated with water. The solid 3 - (p-formamidophenoxy)estra - 1,3,5(10)-trien-17-one obtained is isolated, dried, and dissolved in 50 ml of tetrahydrofuran. This solution is added to a stirred suspension of 1 g. lithium aluminum hydride in 50 ml. of tetrahydrofuran, and the resulting mixture is heated under reflux for 1 hour. After cooling, the mixture is cautiously treated with water, and the aqueous mixture is extracted with ether. The etheral extract is washed well with water, dried, and the dried solution is evaporated to dryness under reduced pressure. The solid 3 - (p-methylaminophenoxy)estra-1,3,5(10)-trien-17β-ol obtained is crystallized several times from benzene; M.P. 127–130° C. and 172–176° C.

Example 3

A solution of 2.25 g. of 3-(p-acetamidophenoxy) - 17β-acetoxyestra-1,3,5(10)-triene in 20 ml. of anhydrous tetrahydrofuran is added dropwise to well-stirred suspension of 1.0 g. of lithium aluminum hydride in 100 ml. of anhydrous tetrahydrofuran, and the resulting mixture is subsequently heated under reflux for 6 hours. After cooling, the mixture is cautiously treated, first with water, then with 5 N sodium hydroxide, and with water again. The aqueous mixture is filtered, and the filtrate is extracted with ether. The ethereal extract is washed with water until neutral, dried, and evaporated to dryness under reduced pressure to yield 3-(p-ethylaminophenoxy)-estra-1,3,5(10)-trien-17β-ol.

The 3 - (p - acetamidophenoxy)17β-acetoxyestra-1,3,5(10)-triene used as starting material in the foregoing procedure is prepared as follows. A mixture consisting of 3.6 g. of 3-(p-aminophenoxy)estra-1,3,5(10)-trien-17β-ol, 3.0 ml. of acetic anhydride, and 20 ml. of pyridine is kept at room temperature overnight and is then poured into iced dilute hydrochloric acid. The acidic mixture is extracted with ether-methylene chloride, and the extract is washed, first with water, then with saturated aqueous sodium bicarbonate, and with water again. After drying, the extract is evaporated under reduced pressure, and the solid 3-(p-acetamidophenoxy)-17β-acetoxyestra-1,3,5(10)-triene obtained is crystallized from n-hexane-acetone.

Example 4

A mixture consisting of 2 g. of 3-(p-dimethylaminophenoxy)estra-1,3,5(10)-trien-17-one, 2 g. of potassium borohydride, 50 ml. of benzene, and 50 ml. of methanol is stirred at room temperature for 1 hour. After the addition of 3 ml. of glacial acetic acid, the mixture is poured into water, the aqueous mixture is made alkaline with 2 N sodium hydroxide, and the alkaline mixture is extracted with ether. The ethereal extract is washed with water, dried, and evaporated to dryness under reduced pressure. The solid 3-(p-dimethylaminophenoxy)estra-1,3,5(10)-trien-17β-ol obtained is crystallized several times from benzene-n-hexane; M.P. 172–173° C.

The hydrochloride salt is prepared by treating an ethereal solution of 3-(p-dimethylaminophenoxy)estra-1,3,5(10)-trien-17β-ol with a slight excess of hydrogen chloride and isolating the precipitated solid.

To a solution of 0.4 g. of 3-(p-dimethylaminophenoxy)-17α-methylestra-1,3,5(10)-trien-17β-ol in 25 ml. of absolute ethanol is added a solution of 0.1 g. of citric acid in 10 ml. of absolute ethanol. After a few minutes at room temperature, dry ether is slowly added to the stirred mixture until a precipitate of the citrate salt is obtained. The solid thus obtained is isolated and dried.

The 3-(p-dimethylaminophenoxy)estra-1,3,5(10)-trien-17-one used as starting material in the foregoing procedure is prepared as follows. A mixture consisting of 979 mg. of 3-(p-nitrophenoxy)estra-1,3,5(10)-trien-17-one, 1 g. of 5% palladium on charcoal, 180 ml. of ethanol, and 20 ml. of glacial acetic acid is shaken at room temperature with hydrogen at one atmosphere pressure until 190 ml. of hydrogen is absorbed. To the mixture, now containing 3-(p-aminophenoxy)estra-1,3,5(10)-trien-17-one, is added formalin (1 ml., 36%), and hydrogenation is resumed and continued until no more hydrogen is absorbed. The catalyst is removed by filtration, and the filtrate is concentrated and poured into water. The aqueous mixture is extracted with ether, and the ether extract is washed succesively with aqueous sodium bicarbonate solution and water, dried and evaporated to dryness under reduced presure. The 3-(p-dimethylaminophenoxy)estra-1,2,5(10)-trien-17-one obtained is isolated and crystallized from methanol; M.P. 170–172° C.

Example 5

A solution of g. of 3-(p-dimethylaminophenoxy)-estra-1,3,5(10)-trien-17-one in 200 ml. of dry ether and 150 ml. of dry tetrahydrofuran is added over a period of 10 minutes to a stirred ethereal solution of methyl lithium (prepared from 2.5 g. of lithium metal and 11 ml. of methyl iodide in 50 ml. of dry ether), and the resulting mixture is heated under reflux with stirring for 9.5 hours. The cooled mixture is treated with water, and extracted with ether. The ether extract is washed, first with water, then with aqueous sodium thiosulfate solution, and finally 3 times with water again. After drying, the other solution is evaporated to dryness under reduced pressure to give 3 - (p-dimethylaminophenoxy) - 17α - methylestra- 1,3,5(10)-trien-17β-ol; M.P. 133–136° C., following several crystallizations from benzene.

An ethereal solution of 1.0 g. of 3-(p-dimethylaminophenoxy) - 17α - methylestra - 1,3,5(10)-trien-17β-ol is treated with a slight excess of hydrogen chloride, the resulting mixture is allowed to stand for a few minutes, and the precipitated hydrochloride salt of 3-(p-dimethylaminophenoxy)-17α-methylestra-1,3,5(10)-trien-17β-ol is isolated, washed with ether and dried.

The lactate salt of 3-(p-dimethylaminophenoxy)-17α-methylestra-1,3,5(10)-trien-17β-ol can be obtained by treating an ethereal solution of the free base with an equivalent amount of lactic acid, concentrating the resulting mixture, and isolating the precipitated salt.

Example 6

Over a period of one hour, dry acetylene is passed through a well-stirred solution of 1 g. of potassium in 25 ml. of anhydrous t-amyl alcohol at room temperature. To the resulting solution is added a solution of 1 g. of 3 - (p-dimethylaminophenoxy)-estra-1,3,5(10)-trien-17-one in 75 ml. of anhydrous toluene, and dry acetylene is passed through the stirred mixture for 18 hours at room temperature. After treatment with 10% aqueous ammonium chloride, the reaction mixture is steam distilled, and the residue is extracted with ether-methylene chloride. The organic extract is washed well with water, dried, and evaporated to dryness under reduced pressure to give 3-(p-dimethylaminophenoxy)-17α-ethynylestra-1,3,5(10)-trien-17β-ol.

Example 7

By employing the procedure of Example 6 above, with the substitution of 1 g. of 3-(p-diethylaminophenoxy)-estra-1,3,5(10)-trien-17-one for the 3-(p-dimethylaminophenoxy)estra-1,3,5(10)-trien-17-one, there is obtained 3 - (p-diethylaminophenoxy)-17α-ethynylestra-1,3,5(10)-trien-17β-ol.

The 3 - (p-diethylaminophenoxy)estra-1,3,5(10)-trien-17-one used as starting material is prepared according to the following procedure. A mixture consisting of 979 mg. of 3-(p-nitrophenoxy)estra-1,3,5(10)-trien-17-one, 1 g. of 5% palladium on charcoal, 180 ml. of ethanol, and 20 ml. of glacial acetic acid is shaken at room temperature with hydrogen at one atmosphere pressure until 190 ml. of hydrogen is absorbed. Acetaldehyde (1 ml.) is added and hydrogenation is resumed and continued until no more hydrogen is absorbed. The catalyst is removed by filtration; the filtrate is concentrated, poured into water, and the aqueous mixture is extracted with ether. The ether extract is washed successively with aqueous sodium bicarbonate solution and with water, dried and evaporated to dryness under reduced pressure to give 3-(p-diethylaminophenoxy)estra-1,3,5,(10)-trien-17-one.

Example 8

A mixture consisting of 2.0 g. of 3-(p-dimethylaminophenoxy)-17α-methylestra-1,3,5(10)-trien-17β-ol, 10 ml. of acetic anhydride, and 10 ml. of pyridine is heated under reflux under nitrogen for 7 hours. After cooling, the reaction mixture is poured into 2 N hydrochloric acid, the resulting aqueous solution is neutralized with dilute aqueous sodium hydroxide, and the neutral solution is extracted with ether-methylene chloride. The organic extract is washed, first with water, then with saturated aqueous sodium bicarbonate, and with water again. After drying, the solvent is removed under reduced pressure, and the solid 3-(p-dimethylaminophenoxy)-17α-methyl-17β-acetoxyestra-1,3,5(10)-triene obtained is crystallized from acetone-n-hexane.

By utilizing the foregoing procedure, with the substitution of 10 ml. of propionic anhydride for the acetic anhydride, there is obtained 3-(p-dimethylaminophenoxy)-17α-methyl-17β-propionoxyestra-1,3,5(10)-triene.

Example 9

A mixture consisting of 1.25 g. of 3-(p-diethylaminophenoxy)-17α-ethynylestra-1,3,5(10)-trien-17β-ol, 1 g. of 5% palladium on charcoal, and 150 ml. of dioxane is shaken at room temperature with hydrogen at one atmosphere pressure until two molecular equivalents of hydrogen are taken up. The catalyst is removed by filtration, and the filtrate is evaporated to dryness to give 3-(p-diethylaminophenoxy) - 17α - ethylestra-1,3,5(10)-trien-17β-ol.

By utilizing the foregoing procedure, with the substitution of 1.25 g. of 3-(p-dimethylaminophenoxy)-17α-ethynylestra-1,3,5(10)-trien-17β-ol for the 3-(p-diethylaminophenoxy)-17α-ethynylestra - 1,3,5(10)-trien-17β-ol, there is obtained 3-(p-dimethylaminophenoxy)-17α-ethylestra-1,3,5(10)-trien-17β-ol.

I claim:

1. A member of the class consisting of 3-(p-aminophenoxy)estra-1,3,5(10)-triene compounds, having the formula

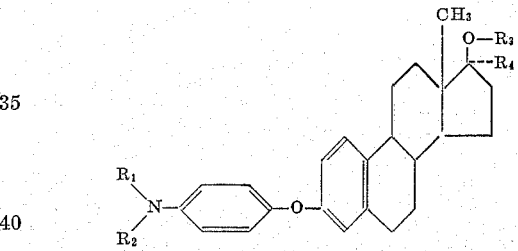

and pharmaceutically-acceptable salts thereof; where each of $R_1$ and $R_2$ is a member of the class consisting of hydrogen, methyl, and ethyl; $R_3$ is a member of the class consisting of hydrogen and lower alkanoyl; and $R_4$ is a member of the class consisting of hydrogen, methyl, ethyl, and ethynyl.

2. 3 - (p - dimethylaminophenoxy) - 17α - methylestra-1,3,5(10)-trien-17β-ol.

3. 3-(p-aminophenoxy)estra-1,3,5(10)-trien-17β-ol.

4. 3-(p - dimethylaminophenoxy)estra-1,3,5(10)-trien-17β-ol.

5. 3 - (p - dimethylaminophenoxy) - 17α - ethynylestra-1,3,5(10)-trien-17β-ol.

References Cited by the Examiner

UNITED STATES PATENTS

| | | | |
|---|---|---|---|
| 2,991,295 | 7/1961 | Magerlein et al. | 260—397.5 |
| 3,212,971 | 10/1965 | Allais et al. | 167—65 |
| 3,214,446 | 10/1965 | Evans et al. | 260—397.5 |

LEWIS GOTTS, *Primary Examiner.*

ELBERT L. ROBERTS, *Examiner.*

THOMAS M. MESHBESHER, *Assistant Examiner.*